United States Patent [19]

Leduc

[11] Patent Number: 5,210,608
[45] Date of Patent: May 11, 1993

[54] METHOD FOR THE CORRECTION OF TELEVISION SIGNALS AT TRANSMISSION, AND IMPLEMENTATION DEVICE

[75] Inventor: Michel Leduc, Boersch, France

[73] Assignee: Laboratoire Europeen de Recherches Electroniques Avancees Societe en Nom Collectif, Courbevoie, France

[21] Appl. No.: 735,296

[22] Filed: Jul. 24, 1991

[30] Foreign Application Priority Data

Aug. 3, 1990 [FR] France ................. 90 09971

[51] Int. Cl.$^5$ ............... H04N 5/213; H04N 9/64
[52] U.S. Cl. ...................... 358/167; 358/36; 380/7; 380/14
[58] Field of Search ........... 358/167, 36, 142; 380/7, 14

[56] References Cited

U.S. PATENT DOCUMENTS

| | | | |
|---|---|---|---|
| 4,777,648 | 10/1988 | Gardner | 358/167 |
| 4,951,314 | 8/1990 | Shreve | 380/14 |
| 4,964,162 | 10/1990 | McAdam et al. | 380/144 |
| 4,972,263 | 11/1990 | Lamdraziu | 358/167 |

FOREIGN PATENT DOCUMENTS

| | | |
|---|---|---|
| 0171759 | 2/1986 | European Pat. Off. . |
| 2413367 | 10/1974 | Fed. Rep. of Germany . |
| 63-260383 | 10/1988 | Japan . |
| WO89/07376 | 10/1989 | PCT Int'l Appl. . |

*Primary Examiner*—John K. Peng
*Attorney, Agent, or Firm*—Oblon, Spivak, McClelland, Maier & Neustadt

[57] ABSTRACT

According to the disclosed method, a reference line is caused to be transmitted during the non-visible part of the image, the transmissions are received with a calibrated receiver, this reference line is sampled, an error signal is produced from the difference between this line and its theoretical value, a correction coefficient is deduced therefrom for each of the samples of the line, and this correction coefficient is applied to the lines of the following frames.

9 Claims, 2 Drawing Sheets

METHOD FOR THE CORRECTION OF TELEVISION SIGNALS AT TRANSMISSION, AND IMPLEMENTATION DEVICE

BACKGROUND OF THE INVENTION

1. Field of the Invention

The present invention relates to a method for the correction of television signals at transmission as well as to a device for the implementation of this method.

2. Description of the Prior Art

The defects created during the transmission of television signals, such as the line tilt phenomenon or the linear distortion phenomenon generally cause no visible problems in reception in a standard television system. However, such defects may become very troublesome when the scrambling used is of the "line cut and rotate" type (where the line is permutated about a randomly determined point at which this line is cut, hereinafter called a "cut point"): these defects may greatly lower the quality of the unscrambled images.

The line tilt of a video signal is characterized by a tilt of a few per cent in this signal. For example, a video line with a constant luminance, normally represented by a horizontal line, is frequently a line that rises or descends slightly. This phenomenon may originate either in the transmission equipment or in the demodulator of the receiver.

The linear distortion generally takes the form of overshoots extending over the entire length of the line. This phenomenon has the same causes as the "line tilt".

SUMMARY OF THE INVENTION

An object of the present invention is to provide a method for the correction of the defects caused by the above-mentioned phenomena, said method being one that is simple to implement, is easily adaptable to existing equipment and cancels the effects of said defects or makes them negligible, especially in scrambled television systems.

Another object of the invention is a device for the implementation of the method of the invention, said device being simple, inexpensive and easy to lay out.

According to the invention, there is proposed a method wherein, during at least a part of the frames of the video signal, the transmitter is made to transmit at least one reference line in the part of the frames not visible on the screen, the transmissions of this transmitter are received at the transmitting station by means of a calibrated receiver, this reference line thus received is sampled and memorized, an error signal is produced from the difference between this memorized line and its theoretical value, the error signal is averaged during several frames, a correction coefficient is deduced therefrom for each of the samples of the line, and this correction coefficient is applied to at least a part of the lines of the following frames.

According to a advantageous aspect of the invention, the correction coefficient is weighted as a function of the luminance of the corresponding line. Advantageously, the mean luminance level of this line is determined.

The correction device according to the invention comprises, in the transmitter, between the video signals source and the power amplifier circuits, an analog/digital converter followed by a memorizing device, a logic correction circuit and a digital/analog converter, the correction circuit being connected to the output of a calibrated receiver. Advantageously, this device includes a device for the detection of the mean luminance level. When the transmitter has a scrambling encoder circuit, the correction circuit is connected downline with respect to this encoder.

BRIEF DESCRIPTION OF THE DRAWINGS

The present invention will be understood more clearly from the following detailed description of an embodiment, taken as a non-restrictive example and illustrated by the appended drawings, wherein.

DETAILED DESCRIPTION OF THE PREFERRED EMBODIMENTS

The method of the invention, explained here below, can be applied to the correction of errors of television signals of a conventional system as well as those of a scrambled television system.

Figure 1:
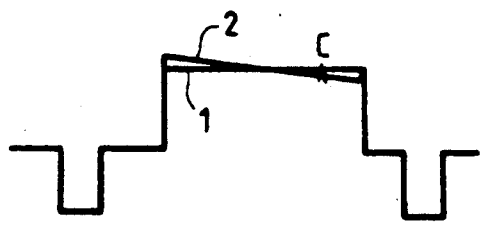
FIGS. 1 to 3 respectively show a timing diagram of a non-scrambled video signal affected by a line tilt, a timing diagram of a scrambled video signal affected by a line tilt and a timing diagram of a video signal affected by linear distortion, FIGS. 4 and 5 respectively show a timing diagram of a reference line transmitted according to the invention and a timing diagram of this same line as received with distortion.

FIG. 1 shows a simplified video signal 1 as transmitted by a television transmitter. The visible part of this signal is a simple horizontal line. At reception, the line tilt phenomenon prompts a slight tilting of this line by plus or minus a few degrees or fractions of a degree, and gives the tilted line 2 which, in this case, is a line descending from left to right.

Figure 2:
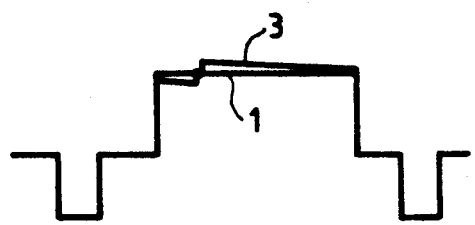

If the video signal 1 is scrambled at transmission, when there is no distortion whatsoever it should give a line that is also horizontal. When the line tilt phenomenon is present, the broken line 3 shown in FIG. 2 is obtained.

Figure 3:
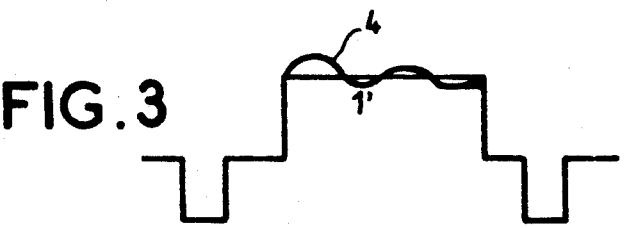

In the case of FIG. 3, it is also assumed that the transmitter sends a video signal at constant luminance which, when there is no distortion, should also give a horizontal line 1' at reception. When there is a linear distortion, the curve 4, in the form of overshoots, is obtained at reception.

Figure 4:

According to the invention, the television transmitter transmits a reference line placed in a non-visible zone of the image, for example at the start of the frame. In the example chosen and shown in FIG. 4, a signal of constant luminosity is sent on line number 16. This signal of constant luminosity would correspond to a white line if it were visible on the screen, and its luminosity is equal to 75% of the white level.

Figure 5:
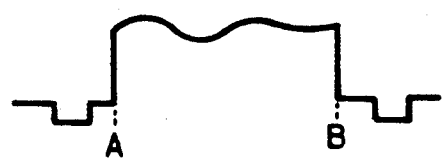

FIG. 5 shows this same reference line as received by a calibrated receiver (positioned in the transmitter station) with a distortion due chiefly to a linear distortion.

Figure 6:
FIG. 6 shows a timing diagram of an error signal stored according to the invention, and relating to the signals of FIGS. 4 and 5, FIGS. 7 and 8 respectively show a timing diagram of received video line of any nature, affected by distortion, and this line after correction according to the invention.

It being known that the reference line is necessarily a horizontal straight line, it is easy, by taking the difference, to obtain the error signal affecting the part of the line received that is visible on the screen (between the points A and B). The shape of this error signal is shown in FIG. 6 (in fact, this signal is digitalized and, since the digitalization is done at high frequency, the drawing depicts this signal as if it were an analog signal).

The visible part (between A and B) of this line is sampled, and it is memorized in a register with a capacity that is at least sufficient to memorize a complete line. The sampling is controlled at the rate of a clock signal capable of sampling pixels. Advantageously, the frequency of this clock signal is in the range of 10 MHz or more, in order to obtain high resolution.

The error information element thus memorized is averaged under the control of a microprocessor, for example, and this is done during several frames. This operation may be done, for example, when the transmitter or the scrambling system is turned on, or at time intervals determined after tests. It is known that the linear distortion depends, to a certain extent, on the luminance level of the image. Experiments have shown that about 60% of the distortion depends on the luminance level. Consequently, it is very advantageous to apply a correction factor that depends on the luminance level. This correction factor K is determined by measuring the mean luminance level on an order n line, and it is applied to the next line n+1, the factor K ranging between 0 and 1. The detection of the mean luminance level of a video line is done in a manner that is obvious to those skilled in the art, by rectification and integration.

To correct the errors affecting the signal, as received by a calibrated receiver, the error signal E is memorized during N frames (N=some tens for example) and the mean value is determined pixel by pixel. From the next frame (N+1) onwards, the correction thus determined is applied pixel by pixel to each visible line of each frame. The result is then converted into analog form.

Figure 7:
Figure 9:
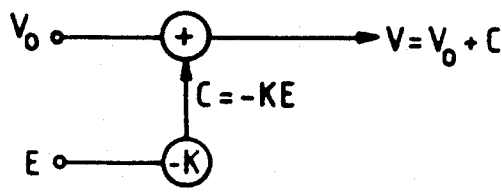
FIG. 9 is a simplified diagram of a circuit for the production of error signals according to the invention.
Figure 8:

FIG. 7 shows a line of a video signal $V_0$ received by said calibrated receiver and affected by a variety of distortions. As shown schematically in FIG. 9, the corresponding error signal E is multiplied by −K to give the weighted correction signal C=KE. C is added to the signal from the transmitter and, at reception, the corrected signal V as shown in FIG. 8 is obtained. Naturally, the correction is then done on the visible lines of the screen.

Figure 10:
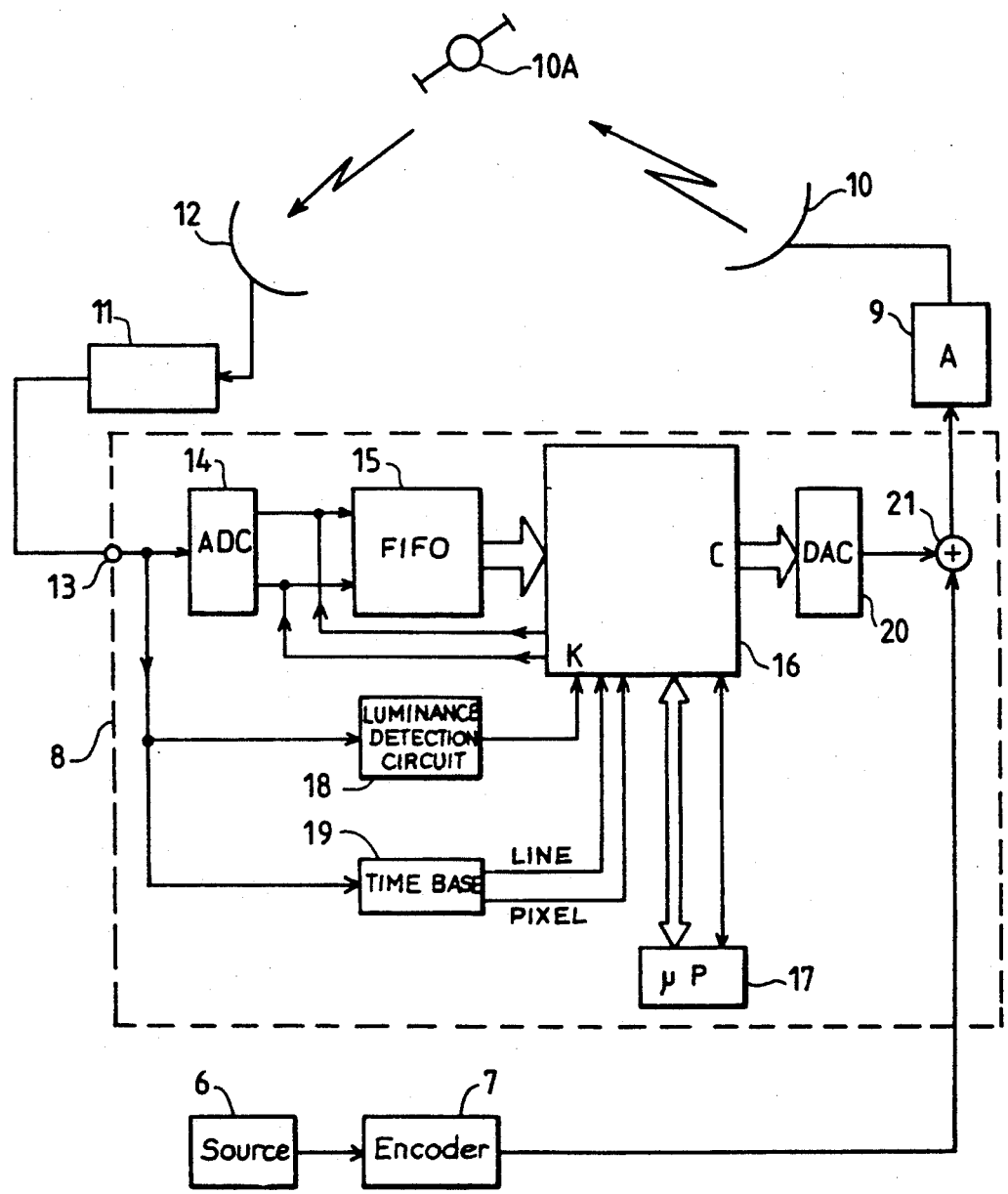
FIG. 10 is a block diagram of a correction device according to the invention.

FIG. 10 shows a block diagram of a television transmitter 5 including a correction device according to the invention. The transmitter 5 has a video signals source 6. The source 6 is followed by a scrambling encoder 7, a correction circuit 8, a transmission amplifier circuit 9 and a transmission antenna 10. In the example shown in the drawing, the transmission goes through a satellite 10A, and the antenna 10 is of a type appropriate to a link such as this, but it is clear that the invention is not restricted to such an application and that it may be implemented in standard ground link systems. The transmitter 5 also has a calibrated receiver 11 provided with an appropriate reception antenna 12.

The correction circuit 8 has an input terminal 13 receiving the output signals from the calibrated receiver 11. The input terminal 13 is connected to an analog-/digital converter 14, the output of which is connected to a line or frame memorization circuit 15 which, in the present example, is a FIFO memory. The output of the memory 15 is connected to a logic circuit 16 carrying out, at each line, the computation C=−KE under the command of a microprocessor 17. The terminal 13 is also connected to a circuit 18 for the detection of the mean luminance level of each line or each frame, and to a time base circuit 19 giving line and pixel synchronization signals. The respective outputs of the circuits 18 and 19 are connected to the circuit 16.

The output of the circuit 16 is connected to a digital-/analog converter 20, the output of which is connected to an input of an adder 21, the other input of which is connected to the encoder 7. The output of the adder 21 is connected to the circuit 9. The corrected video signals $V = V_0 + C$ are collected at the output of the adder 21. Naturally, if the video signals received are in digital form, the converter 14 is unnecessary.

What is claimed is:

1. A method for correction of defects occurring in a video signal during transmission comprising the steps of:
   (a) transmitting, in a portion of the video signal corresponding to a portion of frames of the video signal not visible on a display screen, at least one reference line having defects included therein;
   (b) sampling said at least one reference line at a plurality of points along said line;
   (c) calculating an error signal resulting from a difference between the reference line having defects and a line representing an ideal reference line having no defects;
   (d) calculating a correction coefficient from the error signal for each of said plurality of samples;
   (e) applying said correction coefficient to portions of the video signal during frames following said portion of the frames of the video signal not visible on the display screen; and
   (f) receiving, at a transmission station which includes a calibrated receiver, said transmitted video signal;
   said step of calculating said correction coefficient including applying a weighting function to said error signal based on a luminance level of said video signal.

2. A method according to claim 1, further comprising the step of averaging a plurality of calculated error signals over several frames.

3. A method according to claim 1, wherein the step of applying said weighting function comprises determining a mean luminance level of said video signal.

4. A device for the correction, during transmission, of a video signal having defects included therein, comprising:
   (a) an analog-to-digital converter;
   (b) a memory device, connected in series with said analog-to-digital converter, for receiving an output from said analog-to-digital converter;
   (c) a logic correction circuit, connected to said memory device, for receiving an output from said memory device;
   (d) a luminance detection circuit, having an output connected to said logic correction circuit, for detecting a luminance level of said video signal; and
   (e) a digital-to-analog converter, connected to said logic correction circuit, for receiving an output from said logic correction circuit;
   said analog-to-digital converter, said memory device, said logic correction circuit, said luminance detection circuit and said digital-to-analog converter being connected between a video signal source and a transmission portion of said correction device and being included in a plurality of receivers for applying said correction of defects occurring in the video signals;

said logic correction circuit receiving a luminance level from said luminance detection circuit and calculating a weighting function to be applied to an error signal which represents a difference between an actual reference video signal having defects included therein and an ideal reference video signal without defects in order to thereby compute a correction coefficient.

5. A device according to claim 4, wherein the memory device is a FIFO circuit.

6. A device according to claim 4, further including a device having an output connected to said logic correction circuit for the detection of a mean luminance level of the video signal occurring at a portion of said video signal corresponding to frames of the video signal not visible on a display screen.

7. A device according to claim 4, wherein the correction logic circuit is controlled by a microprocessor.

8. A correction device according to any of the claims 5-7 and 4 for use in a television transmitter.

9. A correction device according to claim 8, including a scrambler device having an input connected to said video signal source.

* * * * *